J. BLAIR.
BRUSH RAKE.
APPLICATION FILED NOV. 26, 1918.

1,313,057.

Patented Aug. 12, 1919.

Witnesses
E. R. Ruppert

Inventor
J. Blair
By Victor J. Evans
Attorney

UNITED STATES PATENT OFFICE.

JOSEPH BLAIR, OF DINUBA, CALIFORNIA.

BRUSH-RAKE.

1,313,057. Specification of Letters Patent. Patented Aug. 12, 1919.

Application filed November 26, 1918. Serial No. 264,204.

*To all whom it may concern:*

Be it known that I, JOSEPH BLAIR, a citizen of the United States, residing at Dinuba, in the county of Tulare and State of California, have invented new and useful Improvements in Brush-Rakes, of which the following is a specification.

This invention relates to new and useful improvements in rakes and the principal object of the invention is to provide means for raking grape vine cuttings.

Another object of the invention is to provide the rake with a drag platform on which the operator rides and which acts as a means for disengaging the dumped cuttings from the rake.

Another object of the invention is to provide means whereby the operator may easily dump the rake from the platform.

With the above and other objects in view, the invention consists in the construction, combination and arrangement of devices hereinafter described and claimed.

Figure 1:
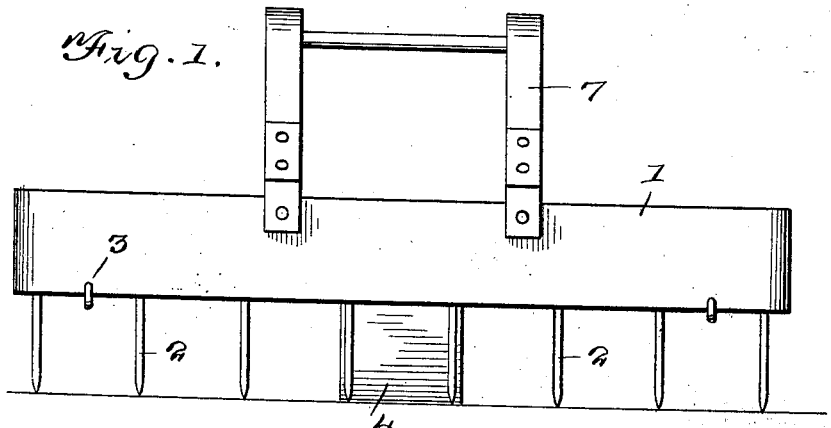
Figure 1 is a front view of the invention.
Figure 2:
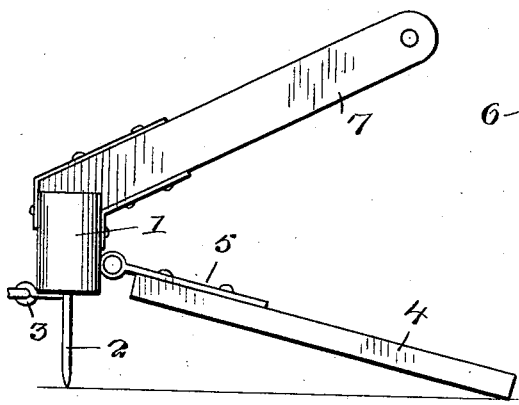
Fig. 2 is an end view.
Figure 3:
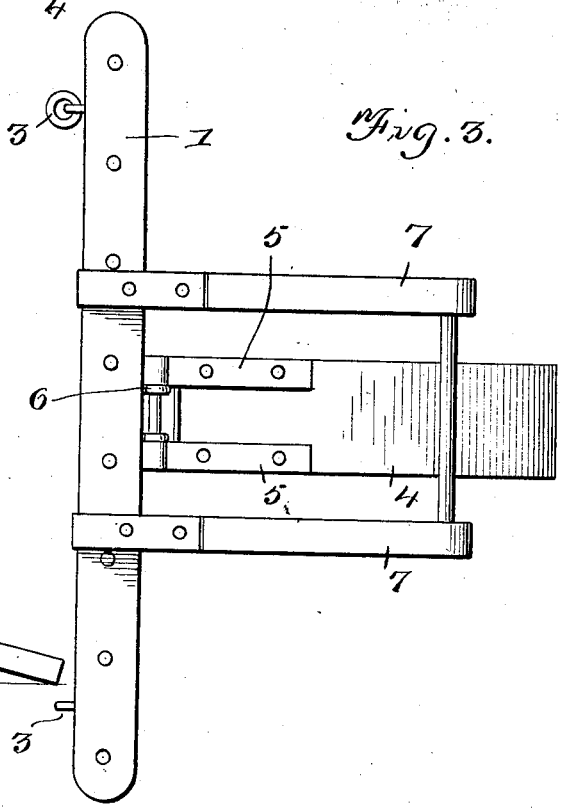
Fig. 3 is a plan view.

In these views, 1 indicates a beam made of any suitable material and of any desired size. This beam carries the teeth 2. The draft means 3 are secured to the lower front corner of the beam. 4 indicates the platform hinged to the rear side of the beam by means of the straps 5 and the eye bolts 6. As shown, the eye bolts are located above the point of attachment of the draft means. 7 indicates the handle or operating lever which is secured to the upper edge of the beam and projects at an angle over the platform.

The operator stands on the platform so that the handle is within easy reach of him. The tractor or the team is suitably connected with the draft attaching means 3 and when the rake is pulled forward the platform will slide over the ground in the rear thereof.

The office of the platform is very important, for the following reasons: The brush is so tangled that when dumped, it would be dragged ahead with the next load picked up, were it not for the fact that the platform, with the operator's weight upon it, holds the dumped load firmly to the ground, while the teeth engage the next load, and tear it loose from the first, thus preventing the scattering of the first load. Some of the cuttings are very long, having rough spurs which clutch and tie in, binding the dumped load with the brush ahead, which tie is effectually broken by the forward movement of the teeth, only when the dumped load is firmly held in place.

After a certain amount of the cuttings has been collected by the rake the rake will be lifted from the ground by the mass, and when the mass shows a tendency to roll, the handle is released by the operator. This will cause the rake to be tilted forwardly and upon the continued movement of the rake the same will slide off the load. The platform slides upon the dumped load, binding it as above stated, whereupon, the teeth, loose from the vaulted load, are drawn forward. The operator then grasps the lever, causing the teeth immediately to engage the next load, which is still tangled with the mass upon which the weight of the operator is imposed. The mass cannot move because his weight upon the platform, and the teeth break up the tangled cuttings, leaving the mass of the dumped load flattened out in such position and condition that the burner tender can lift it all on a fork.

Attention is called to the point of traction application which is below the hinge attachment of the platform so that the disengagement of the teeth, the instant after the vault of the rake, causes the device to assume its normal position, teeth vertical, and automatically returns the handle to the easy reach of the operator.

While I have herein shown and described a preferred embodiment of my invention, I would have it understood that changes may be made in the form, proportion and construction of the several parts without departing from the spirit of my invention and within the scope of the appended claims.

Having thus described my invention, I claim:—

1. A rake of the class described comprising a main bar, teeth carried thereby, a platform having one end hinged to one side of said bar and draft means connected with the other side.

2. A rake of the class described comprising a main bar, teeth carried thereby, a platform having one end hinged to one side of said bar, draft means connected with the other side and an operating handle connected with said bar and extending over the platform.

In testimony whereof I affix my signature.

JOSEPH BLAIR.

Copies of this patent may be obtained for five cents each, by addressing the "Commissioner of Patents, Washington, D. C."